June 7, 1932.   G. H. BOWLUS   1,861,999
MUD FLUID PRESSURE GAUGE
Filed April 10, 1931
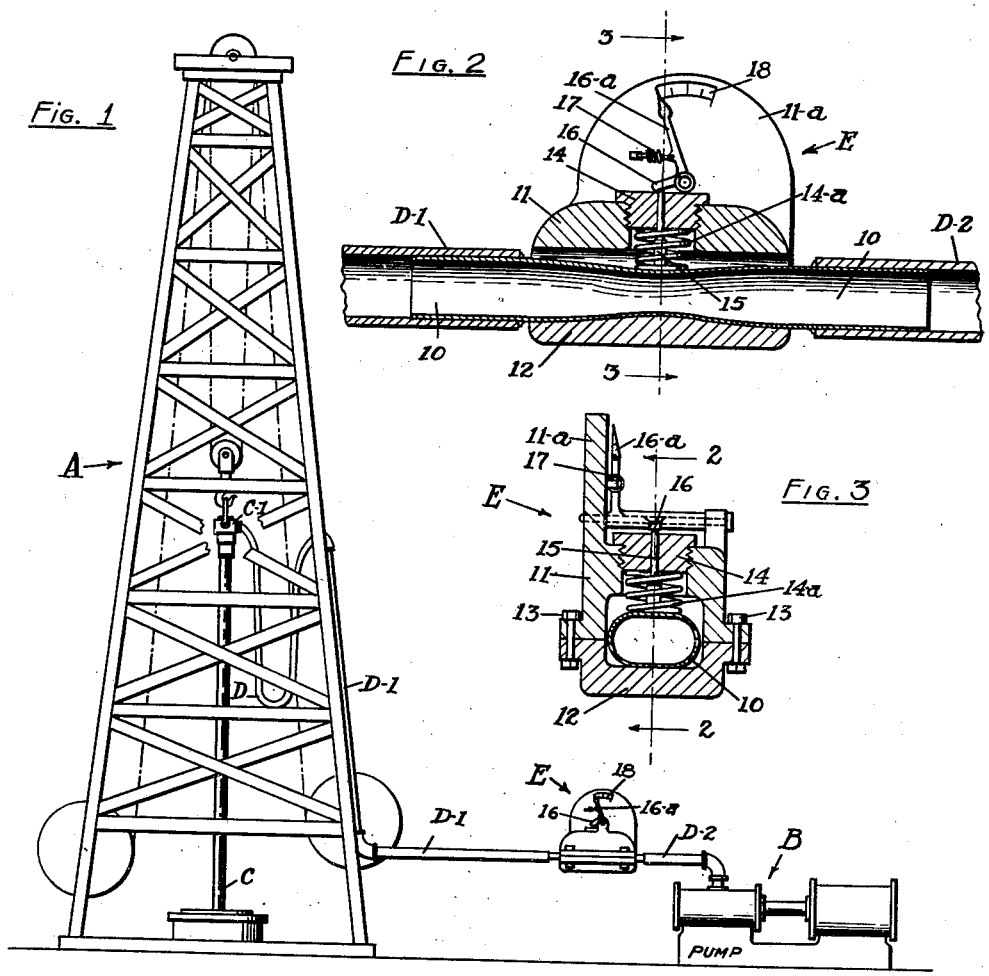
GLENN H. BOWLUS
INVENTOR
By Paul W. Prietzman
Attorney.

Patented June 7, 1932

1,861,999

UNITED STATES PATENT OFFICE

GLENN H. BOWLUS, OF ALHAMBRA, CALIFORNIA

MUD FLUID PRESSURE GAUGE

Application filed April 10, 1931. Serial No. 529,098.

This invention relates specifically to a gauge or pressure indicator for mud fluid in oil well mud-pumping apparatus.

Among the objects of this invention are: to provide a means of indicating or measuring the pressure of a viscous, conglomerate mud fluid constrained within a pipe line; to provide a mud fluid pressure indicator which is positive in operation, simple and durable in construction, easy to operate and maintain, and otherwise highly efficient and which will permit manufacture at very low cost.

As is well known to those familiar with the art, the mud fluid pumped from oil wells is viscous and contains a large percentage of free, solid matter, highly abrasive in its action and having a tendency to cake, harden or solidify when a small amount of moisture is removed from it. This invention contemplates a gauge which is adaptable primarily for use in measuring or indicating pressures of a fluid of the above mentioned character.

The present practice utilizes a small auxiliary pipe tapped into the mud pump line, with a gauge on the dead end, the gauge employing a Bourdon spring to transmit the variable pressure of the fluid in the line from the dead end to a hand on a calibrated dial. A great disadvantage in this arrangement has been found in the fact that the fluid in the restricted passage of the auxiliary pipe close to the gauge is not kept in circulation and, under the enormous pressures to which said fluid is subjected, moisture invariably leaks out around the gauge leaving the remaining material to solidify. Thus in a brief period of time the gauge is rendered useless.

The new feature of this gauge is that when the pump is in operation the entire flow of the mud fluid through the pipe line is allowed to pass freely and unobstructedly through the expansible portion of the gauge. The fluid is thus kept in motion constantly and there are no dead ends nor restricted passages where the fluid could come to rest and deposit its solids, the wide expansible member carrying constantly the full flow of the liquid whose pressure is being indicated. Other advantages will become evident hereinafter.

With the above and other objects in view, this invention consists in the new and useful provision, formation, construction, combination and interrelation of parts, members and features, all as hereinafter disclosed, shown in the drawing and finally pointed out in claims.

In the drawing:

Fig. 1 is a conventional representation of an oil well derrick in elevation, showing mud pumping apparatus with pressure gauge attached.

Fig. 2 shows a preferred form of this invention to an enlarged scale, in a sectional view and partly in elevation, taken along the line 2—2 of Fig. 3.

Fig. 3 represents a sectional view of same, partly in elevation and taken along the line 3—3 of Fig. 2.

Corresponding parts in all figures are designated by the same reference characters.

Referring particularly to the drawing, A, in Fig. 1, represents an oil well rig and derrick, while B designates a mud pump which is suitably connected to casing head C—1 of casing C by a continuous passageway or pipe line consisting of a flexible hose D, and pipes D—1 and D—2, into which pressure gauge E is introduced and suitably connected.

In Figs. 2 and 3 the flexible pipe 10, preferably round in cross section and constructed of suitable material (such as spring brass or tempered steel) capable of resisting repeated slight deformations and also capable of withstanding variable pressures of from 500 pounds per square inch upward, is inserted between the ends of flow line pipes D—1 and D—2 and fixed thereto by an airtight connection. This forms a direct passageway for the mud fluid through said pipe line. It is evident that an outside pressure exerted on said flexible pipe 10 in excess of the inside pressure of the mud fluid will cause more or less deformation of the cross sectional contour of said pipe.

A more refined means than herein shown for measuring or indicating the aforesaid deformation of pipe 10 may be used, but a suitable means essentially embodies a main housing comprising a main portion 11 with suitable mounting 11—a for dial 18 integral therewith and a cap 12 bolted thereto by bolts 13 which fit loosely around aforesaid pipe 10 and between the ends of above mentioned pipes D—1 and D—2. In the top of said housing 11 is retained a threaded plug 14 which serves as an adjustment for the pressure of spring 14—a against the aforesaid pipe 10.

A sliding plunger 15 passes vertically through said plug 14, the lower end of which plunger coacts with the outer wall of said pipe 10 and the upper end of which co-acts with a lever 16 attached either directly or indirectly to an indicating hand or pointer 16—a. This pointer works against the tension of a light spring 17, the object of which is to take up lost motion, and transmits the magnitude of the deformation of said pipe 10 to a visible dial 18 calibrated to indicate the corresponding pressure of the mud fluid within the pump line.

No invention is claimed, however, in the means or method used to perform the function of lever 16, pointer 16—a and dial 18, namely, that of indicating movement of the plunger 15 as any suitable means, either mechanical or electrical, may suffice.

Other portions of the device are obvious to those skilled in the art.

Having thus described my invention in connection with an illustrative embodiment, it will be understood that many variants thereof are possible to those skilled in the art and that my invention is not limited to the particular construction herein described and shown.

I claim as my invention:

1. Improvements of the character disclosed in a mud fluid pressure indicator, including a normally round metallic pipe capable of lateral deformation fastened in a mud fluid flow line; resilient means for applying exterior pressure to produce a deformation; a movable plunger in contact with the outer wall of said pipe at its point of maximum deformation, and a movable pointer coacting with said plunger to indicate variations in said deformation following variations in the pressure within said pipe.

2. In a mechanism of the character disclosed, the combination of: a flexible metal pipe adapted to carry a flowing liquid; a suitable housing for same provided with an adjustable compression spring for resisting deformation of said pipe by the pressure of the constrained fluid flow therein; a plunger coacting with the outer surface of said pipe and actuated by changes of pressure within said pipe, and means for visually indicating movements of said plunger.

3. A mud fluid pressure gauge, comprising: a tube adapted to transmit a flow-stream of mud fluid under pressure, a portion of the wall of said tube being capable of lateral movement; resilient means for resisting an outward movement of said portion, and means for measuring the extent of the lateral movements produced by variations of pressure within said pipe acting against the resistance of said resilient means.

In witness that I claim the foregoing I have hereunto subscribed my name this 31st day of March, 1931.

GLENN H. BOWLUS.